US007706515B1

(12) United States Patent
Ketterer

(10) Patent No.: US 7,706,515 B1
(45) Date of Patent: Apr. 27, 2010

(54) PROGRAMMABLE PAGING CONTROLLER WITH PROGRAMMABLE SWITCH CONTACT

(75) Inventor: Ernest Ketterer, Kinnelon, NJ (US)

(73) Assignee: Bogen Communications, Inc., Ramsey, NJ (US)

( * ) Notice: Subject to any disclaimer, the term of this patent is extended or adjusted under 35 U.S.C. 154(b) by 1043 days.

(21) Appl. No.: 11/331,277

(22) Filed: Jan. 13, 2006

(51) Int. Cl.
*H04M 1/60* (2006.01)
*H04M 9/00* (2006.01)

(52) U.S. Cl. ....................... 379/171; 379/170; 379/172; 340/7.27; 340/7.31; 340/825.37; 340/825.66

(58) Field of Classification Search ................. 379/170, 379/171, 172, 93.09, 93.14, 100.15; 340/7.27, 340/7.31, 825.37, 825.66
See application file for complete search history.

(56) References Cited

U.S. PATENT DOCUMENTS

| | | | | |
|---|---|---|---|---|
| 5,740,235 | A * | 4/1998 | Lester et al. | 340/7.27 |
| 5,991,397 | A * | 11/1999 | Han | 379/373.04 |
| 6,226,370 | B1 * | 5/2001 | Shih | 379/159 |
| 6,650,744 | B1 * | 11/2003 | Hamzeh et al. | 379/170 |

* cited by examiner

*Primary Examiner*—Binh K Tieu
(74) *Attorney, Agent, or Firm*—Collard & Roe, P.C.

(57) ABSTRACT

The present invention is an expandable multi-zone paging and signaling system. In particular, the present invention is an apparatus and method for a paging controller wherein a user can program a response to a non-audio input signal in accordance with a set of prioritized inputs to a telephone interface device. The activity status of the set of prioritized inputs of the selected telephone interface device are combined using a logical OR function. By performing the logical OR function of the activity status of various telephone interface device inputs, the non-audio output signal can be customized to provide useful interactions with other outboard equipment.

4 Claims, 12 Drawing Sheets

| | Feature | Feature Code | Data | Default |
|---|---|---|---|---|
| AUX Relay | Override Disable | 070 | | |
| | Override Enable | 071 | | 071 |
| | Tone Trigger 1 Disable | 072 | | |
| | Tone Trigger 1 Enable | 073 | | 073 |
| | Tone Trigger 2 Disable | 074 | | |
| | Tone Trigger 2 Enable | 075 | | 075 |
| | Page Disable | 076 | | |
| | Page Enable | 077 | | 077 |
| | Night Ring Disable | 078 | | |
| | Night Ring Enable | 079 | | 079 |
| | Delay | 080 | | |
| | No Delay | 081 | | 081 |
| | Priority-Driven | 082 | | |
| | Event-Driven | 083 | | 083 |

FIG. 7

Event Driven No Delay

Event Driven With Delay

Priority Driven No Delay

PROGRAMMABLE PAGING CONTROLLER WITH PROGRAMMABLE SWITCH CONTACT

FIELD OF THE INVENTION

The present invention is generally related to audio sound systems that include paging capabilities. In particular, the present invention is directed to an apparatus and a method for a programmable paging controller.

BACKGROUND OF THE INVENTION

Audio sound and loudspeaker systems often require real-time, live audio inputs for paging and making other announcements. Microphones and telephones are two examples of devices that often provide these inputs. Unlike microphones, telephones are ubiquitous in our society in that they are available in many non-entertainment venues, such as offices, warehouses, retail shops and the like. As such, telephone equipment is a preferred live input source in voice paging and announcement systems.

Background art audio sound and loudspeaker systems often obtain live audio inputs from output ports provided by a standard telephone system. Typically, these telephonic output ports meet established standards for electrical characteristics and functions for a telephone system. However, since the target usage of these telephone ports is for telephonic communications, there is a need in the art for some adaptation of the telephone signal before applying that signal to an audio sound and loudspeaker system.

Some background art telephone equipments do provide outputs for direct connection to audio sound and loudspeaker systems. However, many times the features available on these background art telephone equipment outputs do not allow for some desirable features for an audio system operations such as muting of background music during an audio page, or routing audio signals to distinct areas of a facility. In addition, the feature set and electrical characteristics of these background art telephone equipment outputs often vary from one telephone equipment manufacturer to another. This situation can make it difficult to plan the proper equipment interface to an audio sound and loudspeaker system.

In the background art, the only input in the telephone interface device that can detect the DTMF tones is the general paging input. Other inputs may not be connected to sources that produce DTMF tones. For example, tone triggers or the night ring input detects an incoming ring but never answers a call. In these instances, the input has associated with it a user programmable zone group. When the input becomes active, its associated zone group is engaged and determines where the audio will be delivered.

Therefore, there is a need in the art for a paging system some adaptation of the telephone signal before applying that signal to an audio sound and loudspeaker system; features for an audio system operations such as muting of background music during an audio page, or routing audio signals to distinct areas of a facility; and that provides consistent input/output (I/O) interfaces.

SUMMARY OF THE INVENTION

The present invention is an expandable multi-zone paging and signaling system. In particular, the present invention is an apparatus and method for a paging controller wherein a user can program a response in accordance with a set of prioritized inputs to a telephone interface device. Further, in the present invention, the activity status of the set of prioritized inputs of the selected telephone interface device are combined using a logical OR function. By performing the logical OR of the activity status of various telephone interface device inputs, a non-audio output signal can be customized to provide useful interactions with other outboard equipment.

One embodiment of the present invention is an a programmable paging controller for controllably connecting a signal from a telephone system to at least one audio output, the programmable paging controller providing a controllable switch, comprising: a controller; a plurality of input ports and input terminals; a plurality of input interface circuits for conducting an active input signal received on at least one of the plurality of input ports and input terminals; at least one output port, each output port adapted to be connected to an output module; and a controllable switch presenting a pair of terminals that are one of closed or open. In this embodiment of the invention, the input interface circuits are driven to a distinguishable state when an associated input port or input terminal receives an active input signal. In addition, the controller is responsive to a condition of the input interface circuit of each of the plurality of input ports and input terminals. Further, the switching means is controlled by the controller, the compressor is coupled to the at least one output port, and the status of the pair of terminals of the programmable switch is controlled by the controller. Furthermore, this embodiment of the present invention further comprises a compressor is adapted to be coupled between the switching means and the output port and the switching means for selecting at least one of the plurality of input interface circuits for conducting an active input signal to the compressor.

Preferably, the present invention outputs a line level audio signal on the at least one audio output that can be amplified before applying the output to a speaker and provides contact terminals (i.e., see FIG. 1: normally open (NO) common (CO) and normally closed (NC)) outputs for the auxiliary relay. In addition, preferably, in this embodiment of the invention the plurality of input ports includes at least one of an override port, a trunk/page port, a station port, a night ring port, and music input ports. In addition, the plurality of input terminals includes at least tone input terminals.

Preferably, in this embodiment of the invention, a ring and loop detect circuit is the interface circuit for the station port. In addition, a ring detect circuit is the interface circuit for the night ring port. Further, an auxiliary relay control is the interface circuit for the auxiliary contact terminals.

Preferably, in this embodiment of the invention, the controller is coupled to the at least one output port. In addition, the music input ports are adapted to be coupled to the at least one output port. Further, the tone input terminals are coupled to the controller.

Another embodiment of the present invention is a programmable paging controller for controllably connecting a selected one of plurality audio circuits to a paging system and providing a programmable switch comprising: a plurality of input ports, each including a plurality of input terminals, an activity detector, the activity detector driven to a distinguishable state when an associated input terminals receive an active input signal; and an associated circuit for conducting the active input signal received at the associated terminal, at least one output port, each output port adapted to be connected to a unique circuit, a controller responsive to the condition of the activity detector of each of said ports, switching means controlled by said controller for selecting at least one of the associated circuits of one of said ports for connection to a particular output port, and a programmable switch presenting a pair of terminals with a status of closed or open, said status controlled by said controller.

Yet another embodiment of the present invention is a programmable paging controller further comprising an output module that is a zone expansion module. The zone expansion module further comprising: a plurality of module input terminals coupled to the output port; a plurality of jumpers; a plurality of relays coupled to the plurality of module input terminals by the plurality of jumpers; zone module interface circuits; and a plurality of zone module output terminal blocks. In this embodiment of the present invention the jumpers are configured to connect input terminals to selected relays and the zone module interface circuits are coupled to the output terminal blocks. In addition, the zone module interface circuits further comprise adjustable buffer amplifiers coupled to output transformers. It is noted that the adjustable buffer amplifiers are not intended to directly drive a speaker device.

Yet another embodiment of the present invention is a method of controlling a programmable switch presenting a pair of terminals with a status of closed or open in a programmable paging controller having a plurality of input ports and input terminals and at least one output port, said method comprising the steps of: providing a record of a selection of whether the switch is controlled on the basis of at least one active event or on a priority driven basis reflecting a state of the plurality of input circuits; and periodically determining whether the record reflects at least one event selection or a priority basis selection. In the method, if the record reflects at least one event selection, determining whether the record reflects whether any active event should control the switch; if the record reflects control of the switch on the basis of the event, controlling the switch to the appropriate status; and if the record reflects a priority basis selection, determining whether an event with the highest priority is active and controlling the switch in accordance with the determination.

Yet another embodiment of the present invention is the programmable paging controller as discussed above, that further comprises a method for servicing an event driven with no delay comprising the steps of: determining whether any active events have the Aux Relay option enabled; determining whether any active events have ended; activating the Aux Relay option and returning to a calling routine if an enabled event continues; clearing an event ended flag if an active event has ended; determining whether all enabled events have ended; returning to a calling routine if other enabled events continue; and de-activating the Aux Relay and returning to a calling routine if all enabled events have ended, wherein each active event has an event ended flag.

Another embodiment of the present invention is the programmable paging controller as discussed above, that further comprises a method for servicing an event driven with delay comprising the steps of: determining whether any active events have the Aux Relay option enabled; determining whether any active events have ended; clearing an event ended flag if an active event has ended; determining whether all enabled events have ended; returning to a calling routine if other enabled events continue; and activating an Aux Relay for one second and returning to a calling routine if all enabled events have ended, wherein each active event has an event ended flag.

Yet another embodiment of the present invention is the programmable paging controller as discussed above, that further comprises a method for servicing a priority driven with no delay comprising the steps of: determining whether a highest priority event has the Aux Relay option enabled; de-activating the Aux Relay option and returning to a calling routine if a highest priority event is not enabled; determining whether any active events have ended; clearing an event ended flag if an active event has ended; activating an Aux Relay and returning to a calling routine if the event continues; determining whether all enabled events have ended; returning to a calling routine if other enabled events continue; and de-activating the Aux Relay option and returning to a calling routine if all enabled events have ended, wherein each active event has an event ended flag.

Another embodiment of the present invention is the programmable paging controller as discussed above, that further comprises a method for servicing a priority driven with delay comprising the steps of: determining whether a highest priority event has the Aux Relay option enabled; determining whether an event has ended; clearing an event ended flag if an enabled event has ended; determining whether all enabled events have ended; returning to a calling routine if other enabled events continue; activating an Aux Relay for 1 second and returning to a calling routine if all the enabled event have ended; determining whether a highest priority input changed; returning to a calling routine if no change in the highest priority input; determining whether a previous highest priority input has the Aux Relay option enabled; returning to a calling routine if Aux Relay option is not enabled; and activating an Aux Relay for one second if Aux Relay option is enabled and returning to calling routine, wherein each active event has an event ended flag.

As an example, an override input of a prioritized telephone interface device may be accessed only to make emergency announcements. The telephone interface device could be programmed to close a Aux Relay contact only when the override input is active. This relay contact closure would place any bypass equipped volume controls affecting the audio/music volume level in different areas of a facility into a bypass mode and allow the page to be heard at full volume. For all the other lower priority inputs (e.g., general page, tone triggers, background music, etc.), the relay contacts will stay open and the local zone volume controls would control determine the audio volume levels.

In the present invention, in order to provide more flexibility in connecting to other equipment, the telephone interface device non-audio output signal would allow its inactivated or idle state to be inverted. If the non-audio signal were a relay contact closure, the user would be able to select with an "open" or "closed" idle condition. Additionally, the non-audio output signal could change state immediately on detecting the programmed input status event or the non-audio output signal could be programmed to wait until after the status event condition finishes and then change the state of the non-audio output signal. The time duration of the change in state would be predetermined as at least one preset time duration or a user definable time duration. Alternatively, the present invention can also provide a c-form contact set and a set 1-second delay.

In order to provide more flexibility in the use of telephone interface device non-audio output signal, the user can elect to use the input status directly or allow the input priority hierarchy imposed by the telephone interface device to modify the input status. For example assume a tone trigger was given a higher priority than the general page input and the non-audio signal was programmed to change state when the general page input was active. In the case of using the input status directly, the non-audio signals would change state and remain in the alternate state until the general page input became inactive, regardless of the status of any other input.

However, if the priority hierarchy was imposed on this same situation, and a tone trigger became active during the general page, the non-audio signal would return from its alternate state to its idle state for as long as the tone trigger lasted. Assuming the general page was still active after the tone trigger event ended, the non-audio signal would again change to the alternate state for the remaining duration of the general page. In this scenario, the priority hierarchy modified the actual status of the general page input to make it appear as if it were inactive during the higher priority event. If the higher priority event were also programmed as an event for the non-audio signal, then no intermediate change in state would have occurred because either the tone trigger or general page were active.

Another feature of the present invention is routing announcements only to certain areas in a facility. This is normally accomplished by using the DTMF tones used for dialing to select the destination zone. In these systems there are numerous outputs from the telephone interface device and each is wired to audio paging equipment servicing an area or zone in the facility. The present invention provides this function and along with the audio signal a set of normally open and closed contacts follow the status of the output, changing state as it goes from inactive to active and back again.

In addition, the present invention allows zones to be accessed as a group using special codes. Further, the zone groups, the special codes used to activate the zone groups; and zones themselves are all user programmable. Moreover, the present invention allows the codes used to access zone groups and individual zones to be changed to suit the needs of the user. A cross reference table is populated with the native number for the zone or zone group and its desired new dialing code.

In addition to providing audio outputs to an audio system, the present invention supplies non-audio signals to external equipment. These non-audio signals include, but are not limited to, closure of relay contacts, open collector outputs or other bi-state output signals. These non-audio signals are useful in coordinating the operation of outboard equipment used with the audio paging system. In the background art, relay contact closures typically changed state based on either the telephone interface device being accessed by the telephone system or, in multiple zone paging systems, after a zone to page was selected. This relay contact closure would then activate an audio amplifier. After the telephone system disconnected from the telephone interface device, the contact closure returns to an idle state.

In the present invention, the telephone interface devices may have one input for the telephone system to connect to or they may have several inputs. There is typically a priority hierarchy in telephone interface devices with more than one input. Higher priority inputs usually provide emergency or time critical signaling and may interrupt or completely disconnect lower priority pages. A typical single or multi-zone telephone interface device may have a background music input, a normal page input, a high priority override input, one or more inputs that trigger a utility tone in the audio system and a night ring input to annunciate through the audio system that a telephone line is ringing. There is no real limit on the number, type or priority levels of these inputs, but what is described above is generally available in today's market. The priority of each input does not need to be fixed. In the present invention, the user can assign the input priorities to suit their particular needs.

The present invention also provides the function of engaging a zone group whenever the general page input is activated without the need to use a DTMF tone. Once the user invokes the use of this function, he will no longer be able to directly select zones using DTMF codes. When using this function, audio pages made through the general page input will be routed to pre-selected zones. However, other inputs like tone triggers, night ring or override pages can be routed to other zones based on how the zone groups associated with these functions are programmed. The use of zone groups for both the override function and the "all-call" function allows users to omit, or include desired zones in a function's zone group.

The zone outputs and audio switching means of the present invention are provided on plug-in modules that fit into a complementary bay in the paging controller apparatus. Up to four plug-in modules may be installed in an exemplary embodiment of the present invention. Each plug-in module supports at least three separate zone outputs. However, the number of zones supported by a module and the total number of modules could be expanded to a larger number with the appropriate electrical and mechanical changes to the plug-in module.

The programmable paging controller of the present invention may be applied to both single zone and multi-zone interfaces. In addition, the present invention is also applicable in fixed, non-expandable units.

BRIEF DESCRIPTION OF THE DRAWINGS

FIG. 7 shows a portion of the programming table for the present invention.

DETAILED DESCRIPTION

Figure 1:
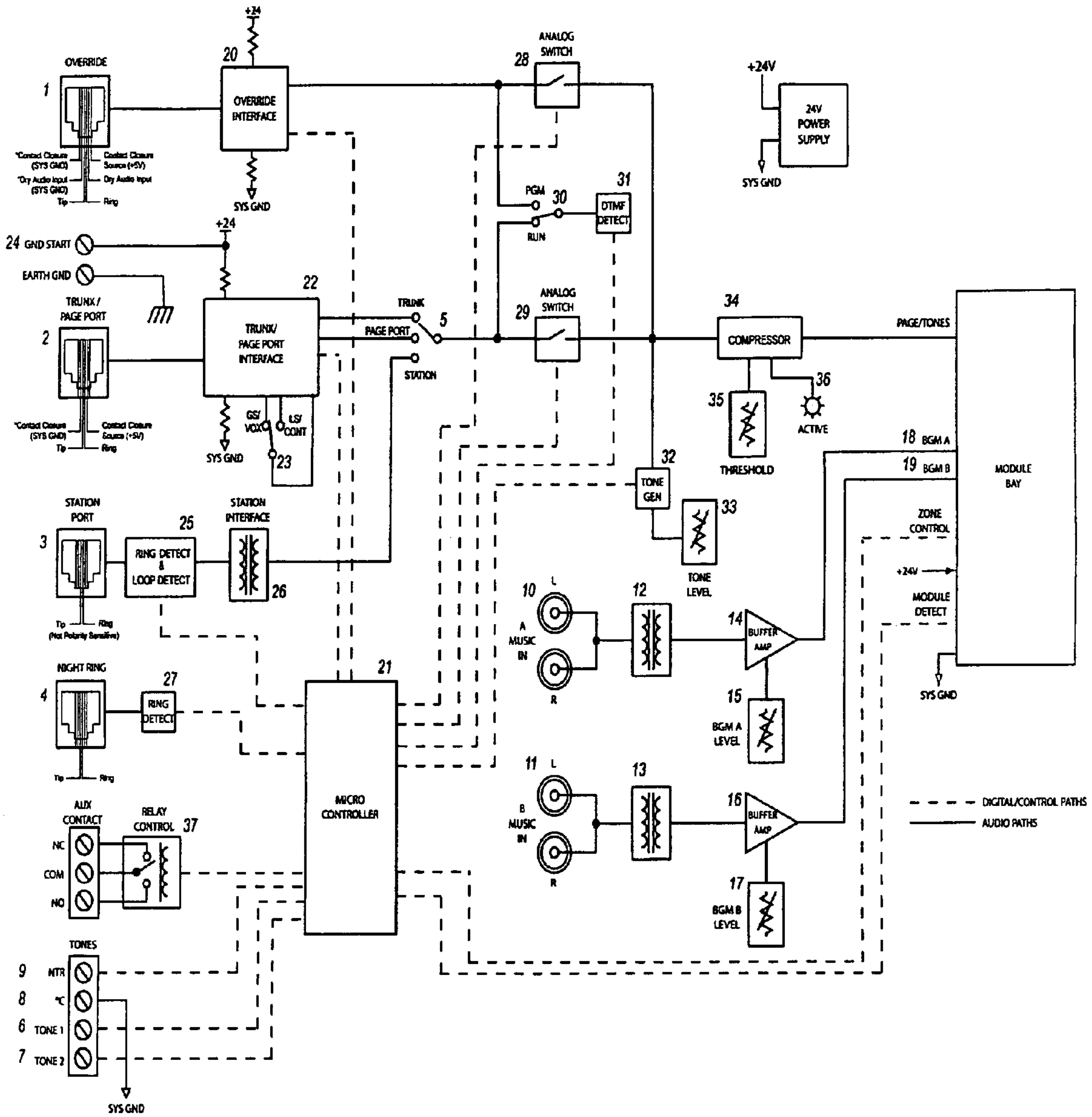
FIG. 1 is an exemplary system block diagram of the apparatus of the present invention.

FIG. 1 is an exemplary system block diagram of the apparatus of the present invention. As shown in FIG. 1, override input port 1 provides an interface that is compatible with, for example, loop start trunk cards and other similar devices. Override input port 1 also provides the present invention with a means to be activated by an external relay contact closure and, once activated, a means to input audio to the telephone interface. The override input port 1 may be in the form of, but is not limited to, an RJ11 connector.

As shown in FIG. 1, the telephone signals from the override input port 1 connector are delivered to an override interface circuit 20. The override interface circuit 20 is designed to supply and detect loop current being drawn by an external device connected to the override input port 1. The detection status of the loop current is reported to the controller 21. An external contact closure applied to the override input port 1 connector can control the loop current detection status of this input.

The Trunk/Page Port input 2 of FIG. 1 is part of the general purpose paging input. The Station Port input 3 is also part of the general purpose paging input. Only one of these two input ports 2, 3 can be used as the general purpose paging input. A selector switch 5 determines which of these two input ports 2, 3 will be active. A secondary switch 23 further selects the type of telephone circuit to which the present invention is connected. The controller 21 monitors the position of both of these switches.

As shown in FIG. 1, the Trunk/Page Port connector 2 is used to interface to Loop Start, Ground Start and Paging ports of telephone circuits. When the 3-position port-type selector switch 5 is set to the Trunk position and the 2-position secondary selector switch 23 is set to the LS position, the trunk/page port interface circuit 22 supplies and detects loop current to the connected outboard telephone equipment. The status of the loop current detector is reported to the controller 21.

When the secondary selector switch 23 of FIG. 1 is set to GS position, signaling from ground start trunks can be detected and the status of the loop current in this configuration is likewise reported to the controller 21. The ground start terminal 24 must be connected to the ground of the telephone equipment supplying the ground start trunk.

As shown in FIG. 1, when the port-type selector switch 5 is set to Page Port and the secondary selector switch 23 is set to CONT, Trunk/Page Port interface circuit 22 will respond when the telephone system provides a contact closure pair, and both Tip and Ring connections. When the secondary selector switch 23 is set to VOX, the trunk/page port interface circuit 22 will monitor the telephone equipment connected to this input for any audio signals and will activate upon sensing any audio signals.

When the port-type switch 5 of FIG. 1 is set to the Station position, the Station Port connector 3 will be selected. The Station Port 3 is used when the telephone circuit to be interfaced to is a Private Branch Exchange (PBX) Station Port, or a Plain Old Telephone System (POTS) line that rings and then must be answered by being taken off hook. The interface circuit for the Ring Detect/Loop Detect input 25 will detect the presence of the high voltage ring signal and report it to the controller 21. The controller 21 will then direct the present invention to answer the telephone call by connecting a station interface transformer 26 across the telephone line. The Ring Detect/Loop Detect input 25 will monitor the resultant loop current condition and report it to the controller 21.

As shown in FIG. 1, the remaining port to which a telephone circuit can be connected is the Night Ring input 4. This Night Ring input 4 uses a ring detector circuit 27 to detect the presences of the high-voltage ringing signal sent by PBX station lines and POTS lines to ring the associated phone. An NTR tone terminal 9 allows an external device contact closure to activate the Night Ring function without the need for a high voltage ring signal. Activation is accomplished by shorting the NTR terminal 9 to the *C terminal 8. The exemplary input port complement shown in FIG. 1 and described above is sufficient for a general-purpose voice paging applications. However, the number of input ports can be scaled to accommodate the number of telephone circuits to which the present invention needs to interface.

In addition to the telephone circuit inputs, the present invention also provides a means to externally trigger two different pre-selected tones. For example, when either input terminal TONE1 6 or TONE2 7, as shown in FIG. 1, is shorted to terminal C 8 the controller 21 will operate in conjunction with a tone generator circuit 32 and a tone volume control 33 to produce a tone signal for distribution through the paging system. For general-purpose audio paging, at least two tone trigger inputs 6, 7 are sufficient. However, any number of tone trigger inputs could be designed into the present invention.

The present invention also provides two inputs for the connection of background music sources. As shown in FIG. 1, each input is supplied through a set of music input connectors 10, 11 that may passively combine a stereo signal or accept a mono signal. Music input connectors 10, 11 may be, but are not limited to, RCA or other well known connector types for audio signals. The resultant signal is isolated by transformers 12, 13 so that the ground from the background music signal does not become interconnected with the ground of the present invention. Buffer amplifiers 14, 16 and volume controls 15, 17 allow the proper amount of signal on to the background music buses 18, 19 that feed the zone module bays.

Live audio pages are supplied through both the override input port 1 and the general-purpose page input 2,3 of FIG. 1. The override input port 1 has a higher priority level than the general-purpose paging input 2, 3. When the override input port 1 becomes active, the controller 21 will close analog switch 28 and open analog switch 29. This will interrupt any signals being processed though the general-purpose page input 2, 3 and route the signal from the override input port 1 to the paging outputs. The desired zone to which the override input port 1 signal will be delivered is previously set-up in a non-volatile ram that may be included as a part of the controller 21. Upon completion of the override page, the state of the analog switches 28, 29 will reverse and any signals on the general-purpose page input 2, 3 will again be delivered to their original zone destinations if the input is still in its active state.

As shown in FIG. 1, the general purpose paging input 2, 3 allows users to select which zone or zones the page will be directed. The user does this by dialing DTMF codes to direct the actions of the paging interface. Likewise, DTMF codes are also used to program and pre-select system choices. When the system programming switch 30 is in the run position, DTMF tones from the telephone equipment attached to the general-purpose paging interface 2, 3 can be detected by a DTMF detector 31. The DTMF detector 31 reports the value of the DTMF tone to the controller 21. When program switch 30 is in the PGM position, the DTMF detector 31 is connected to the Override Port 1 and analog switch 28 is in the open state. Typically, a standard telephone is connected to the override port 1 to program the present invention.

Live pages from the override port 1 and general-purpose paging port 2 inputs of FIG. 1 are processed through a compressor circuit 34. The purpose of the compressor 34 is to reduce the level of loud input signals and provide a generally consistent paging level, regardless of how loud a particular speaker maybe. The maximum signal level before compression begins is set by the threshold control 35. As an aid to properly setting the compressor function, a compressor active LED 36 is provided. This indicator LED 36 illuminates when the compressors threshold has been exceeded. This allows the user to more accurately set the voice level needed to trip the compressor 34.

As shown in FIG. 1, the present invention provides an auxiliary (AUX) relay contact set 37 to control external equipment. This AUX set of relay contacts 37 is controlled by the controller 21 and can be programmed to respond to different events happening within the paging controller apparatus. The action of the AUX relay contacts 37 is programmable by the user. Any of the inputs to the paging controller apparatus, except for the background music inputs, can be used to control the AUX relay contact state. The activation of each input is considered an event within the present invention. Any event can be combined with other events in a logical OR fashion. Alternatively, the present invention can provide a c-form contact set and a set 1, second delay, as discussed below.

Additionally, the response to the AUX relay contact state can be selected to follow the logical OR of these events or cause the AUX relay contacts 37 to produce a 1-second change in state after the all the logical OR events have ended. The inputs to the present invention all fit into a priority hierarchy and the AUX relay contact set 37 may respond with respect to this priority hierarchy. Alternatively, the present invention may ignore the priority hierarchy structure and respond solely to the activation state of the various inputs to the system.

Figure 2:
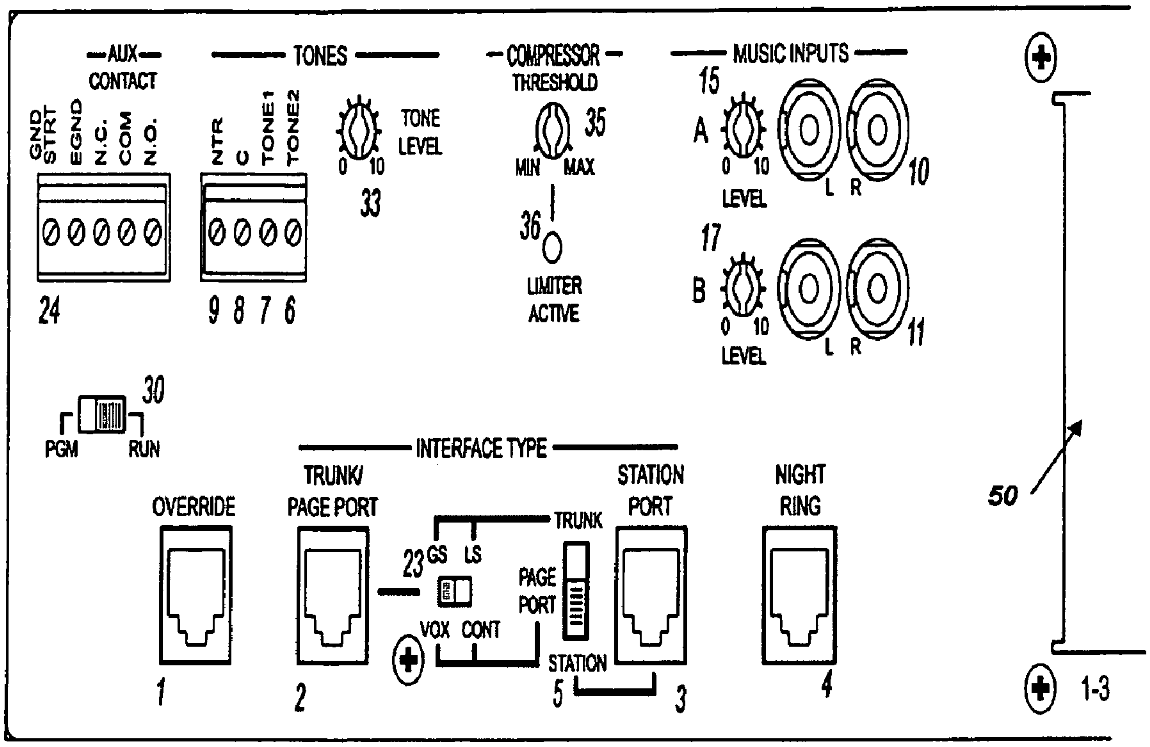
FIG. 2 shows an exemplary view of the general-purpose paging input portion of the front panel of the present invention.
Figure 3:
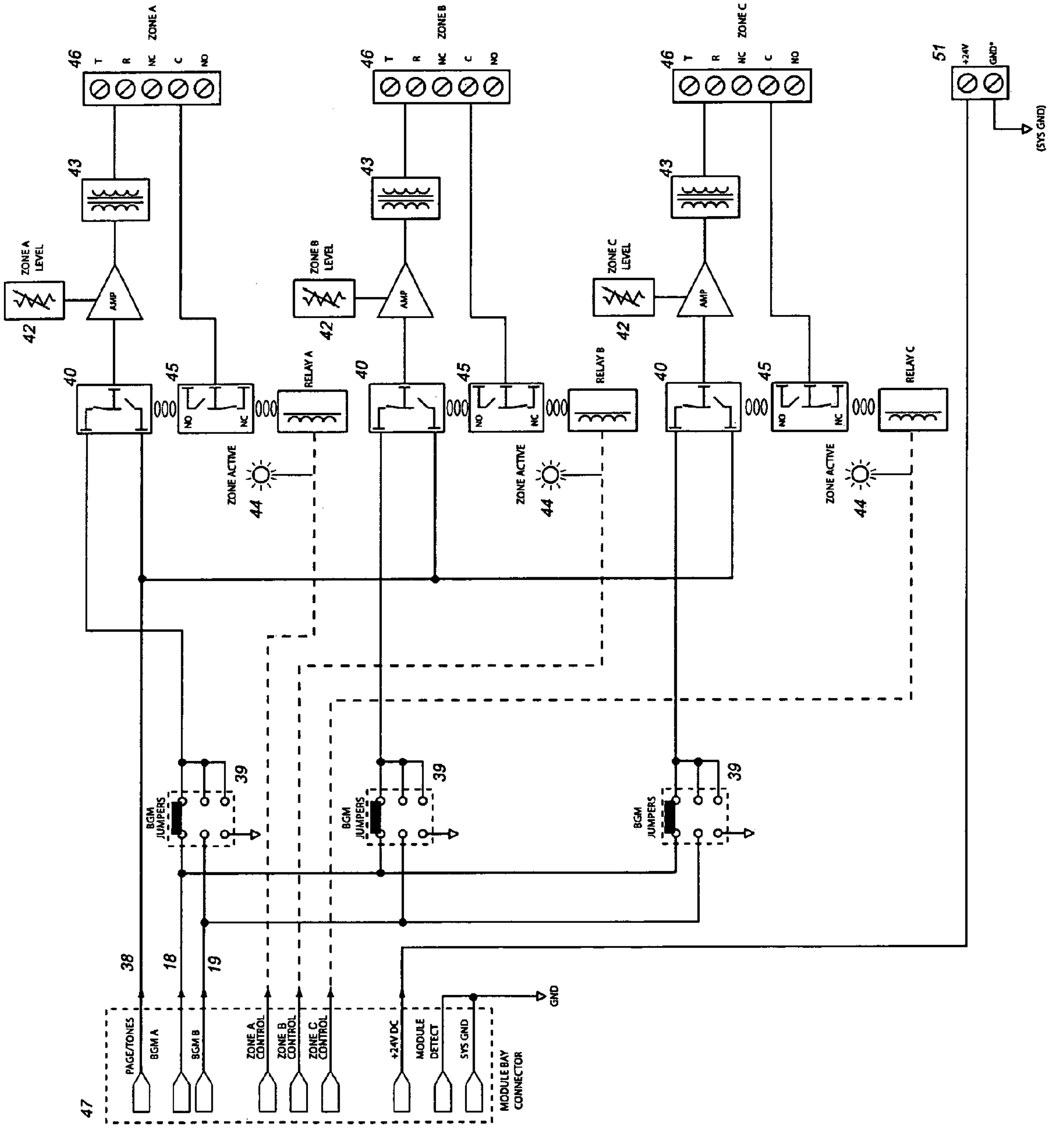
FIG. 3 shows an exemplary block diagram of a zone module of the present invention.
Figure 4:
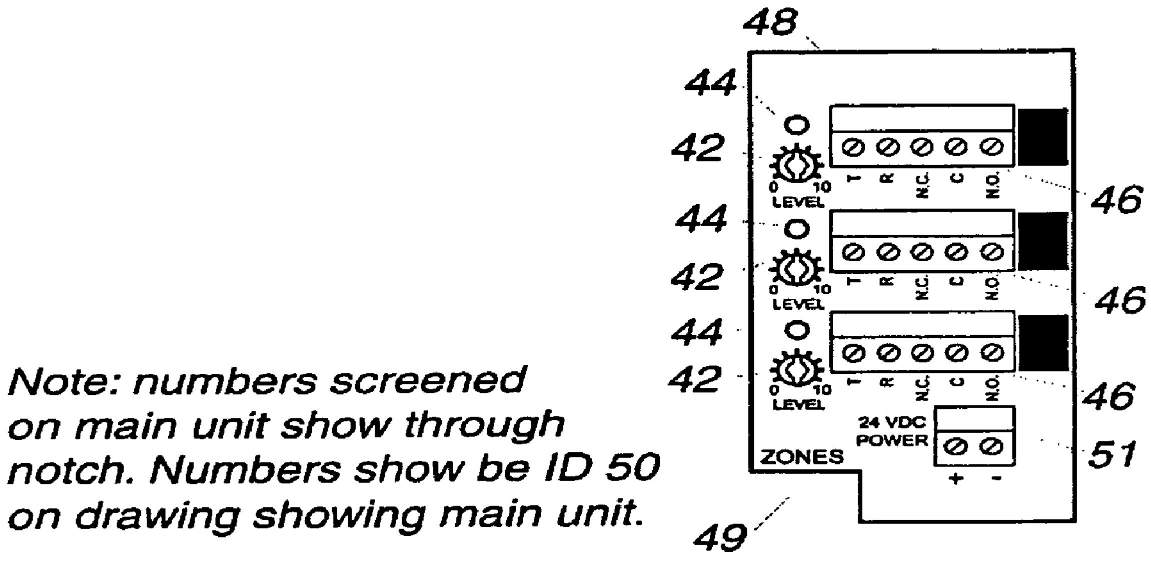
FIG. 4 shows an exemplary front view of the tone module of the present invention.
Figure 5:
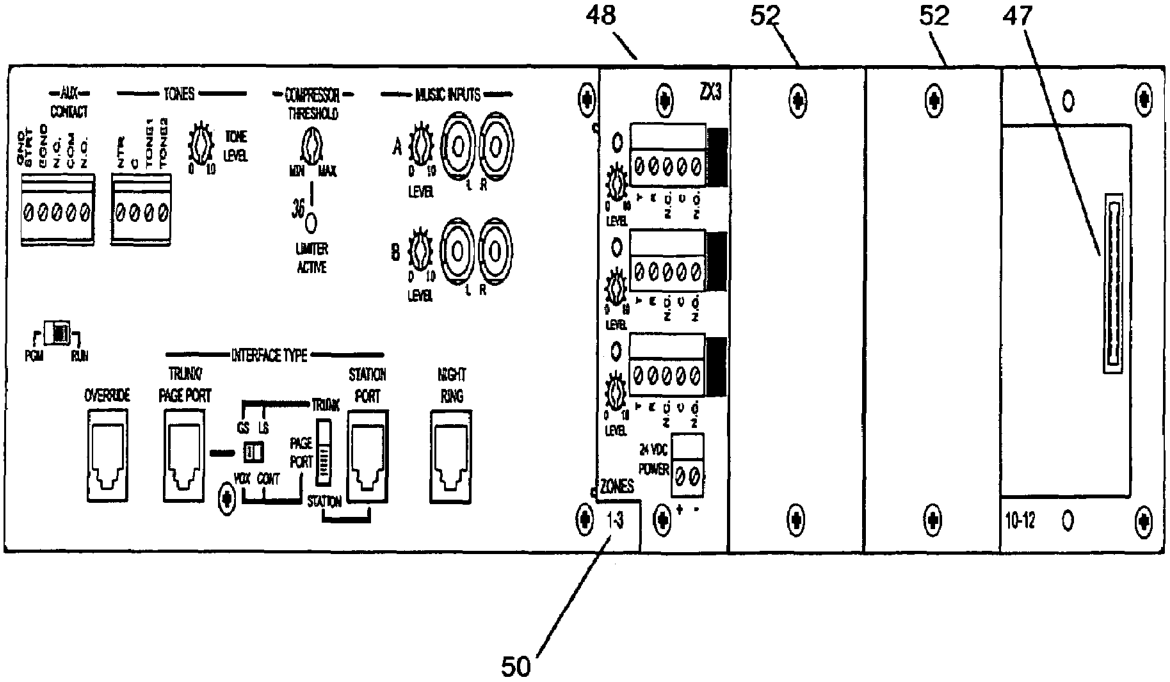
FIG. 5 shows an exemplary view of the entire front panel of the present invention.

FIG. 2 shows an exemplary view of the general-purpose paging input portion of the front panel of the present invention. FIG. 3 shows a schematic diagram of the zone module 48 and FIG. 4 shows a front view of the zone module 48. FIG. 5 shows a front view of the entire assembly with the zone module 48 installed in the left most module bay 39 and module bay covers 52 installed in the next two bays of the assembly. The right most module bay has no bay cover installed so as to show details of the main unit's module bay opening.

In the particular embodiment of the present invention shown in FIG. 5, the zone modules 48 provide outputs to three different zones and the paging controller assembly can accommodate at least four tone modules 48, bringing the total zone capacity of the exemplary paging controller to at least twelve. Of course any number of zones per module and modules per main unit can easily be obtained by electrically and mechanically scaling the design accordingly.

As shown in FIG. 5, the zone module 48 makes a connection to the paging controller assembly unit through the use of a module connector 47 located in the rear of the interior of the assembly. In addition, the zone module connector 47 of FIG. 3 is, for example but not limited to, a card edge type connector.

As shown in FIG. 3, each zone module 48 is supplied with two background music busses 18, 19, as well as the paging audio signal 38 and digital signal inputs that control the state of the various relays for each zone on the module. A jumper field 39 exists for each zone circuit. The placement of the jumper in each field determines if that zone's output will produce background music (BGM) that exists on BGM buss A 18, BGM buss B 19, or no background music at all. The selected background music buss is delivered to the normally closed contacts of a zone control relay 40 for each zone circuit. Likewise, the page audio buss 38 is delivered to the normally closed contacts of the zone control relay.

As shown in FIG. 3, when the zone is active, the page audio is routed to the zone buffer amplifier 42. Alternatively, when the zone module 48 is inactive, the audio content of the selected background music buss is supplied to the zone module buffer amplifier 41 that has an associated volume control 42. The zone module buffer amplifier 41 drives a transformer 43 that provides a balanced output signal to the load in the zone as well as the proper output impedance and electrical isolation. A pluggable terminal strip connector 46 provides the means for making wiring connections to the external load and equipment for the zone module 48.

A set of C-form zone-contacts is available for each zone output. As shown in FIG. 3, the contact set is part of the zone control relay 40, 45 and changes state when the zone becomes at least one of active and inactive. The LED 44 of FIG. 3 indicates the status of each zone. It is illuminated when the zone is active and unlit when the zone is inactive. Each zone module 48 has a means of signaling to the main unit that it is installed. There are many ways to do this, including but not limited to, using mechanical, optical, magnetic methods.

However, preferably electrical signaling through a contact on the module bay connector 47 is used in the present invention. This allows the controller 21 to determine which positions in the module bay 56 are occupied and therefore, which zones are installed. The faceplate of each zone module 48 contains a notch 49 that exposes numbers 50, screened onto the main unit, that correspond to the zone numbers to which that the particular module will respond. Plates without notches 52 cover unused module positions. These plates without notches 52 obscure the numbers 50 screened onto the main unit. Only zones corresponding to modules actually installed will activate. Selection of zones not installed will cause the unit to send an error tone to the operator making the page. A power connector 51 provides access to the main unit's internal 24VDC power supply for powering external equipment.

Figure 6:
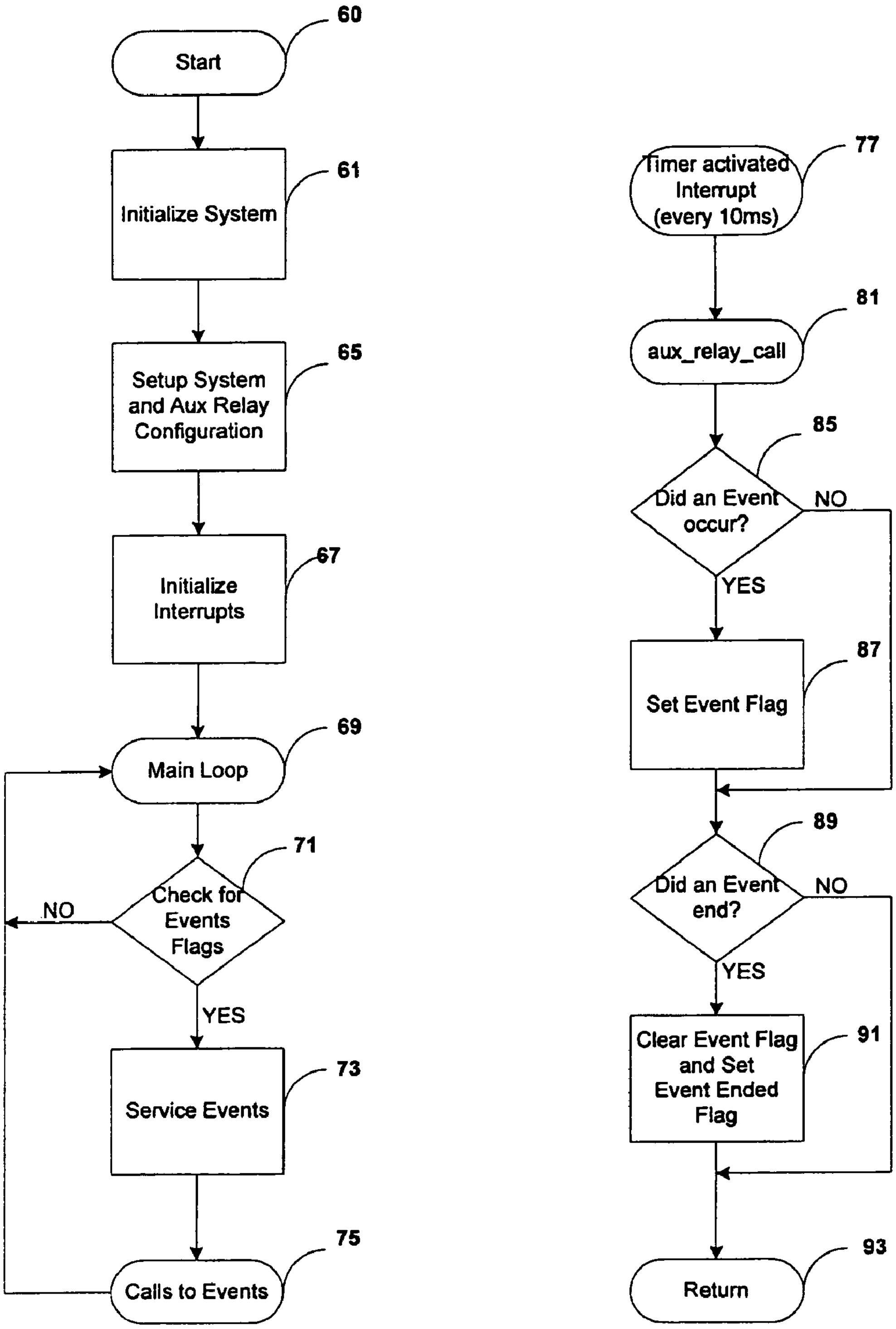
FIG. 6 shows an exemplary flow diagram of the method of the main software loop of the present invention.

FIG. 6 is a flow chart of the method of the main software loop of the present invention. At step 61 and upon power up, the unit initializes the states of various registers, memory location and I/O devices. After this initialization, the unit reviews the preprogrammed parameters for various features, sets up the system and Aux Relay configurations and further configures the software in step 65. Various interrupts within the controller are configured and enabled in step 67.

Next, the flow diagram of FIG. 6 shows the program entering the main loop of the application in step 69. In this main loop, the controller scans various event flags set by the interrupt routines in step 71. At least one of the interrupts is configured to produce a scan of the entire unit inputs at least every 10 ms. Depending on the results of this scan, various flags are set which the main loop then uses to determine how to respond to the input.

Regardless of the status of the main loop's activity, the inputs are scanned every 10 mS, as indicated in step 77. This type of operation ensures that new input events get serviced as soon as possible. In addition to detecting input events in steps 85-87, the interrupts also perform other functions such as tracking elapsed time since system audio has exceeded a certain threshold and various other monitoring needs in steps 89-91.

During the servicing of an event in step 73, the interrupts in the system may coordinate with the main loop in steps 60-75 by using various flags. The main loop can likewise affect the operation of the routines called by the interrupts by using these flags as well.

The present invention provides an auxiliary C-form contact set 37 to control external equipment. This Aux Relay function controls a set of contacts, which the user can program to respond to different events happening within the system. Any of the external inputs to the system, except for the background music inputs, can be used to control the Aux Relay action. The activation of each external input is considered an event by the present invention.

Any event can be combined with other events in a logical OR fashion to control the Aux Relay contacts 37. The external inputs of the present invention are arranged into a priority hierarchy. The override input 1 is the highest priority with the other inputs falling below in the following order: Tone 1 7, Tone 2 6, General Purpose Paging input 2, 3 (depending on port type), Night Ring 4, and Background Music 10, 11. The Aux Relay contact set 37 may respond to input activation with respect to this priority hierarchy (e.g., programming selection—"Priority Driven"), or it may ignore the priority hierarchy and respond solely on the raw activation status of the various external inputs (e.g., programming selection—"Event Driven").

In Priority Driven mode, the Aux Relays act in response to the current highest priority input. When responding with respect to the priority hierarchy scheme, a lower level input may be enabled to control the Auxillary Relay contacts while a higher priority input may not. In this case, if the lower priority event is already active when the higher priority event becomes active, the Auxillary Relay contacts will respond as if the lower priority event has ended and disengage. If the lower priority event is still active when the higher priority event ends, the Auxillary Relay contacts will respond as if that event had just newly occurred. Additionally, the Aux Relay contact can be programmed to respond while the event, or events, are active (e.g., programming selection—"No Delay") or to wait until all relevant inputs have become inactive and then produce a 1-second change of contact state (programming selection—"Delay").

FIG. 7 shows an exemplary portion of the programming table for the present invention relevant to the Aux Relay function. As a non-limiting example, DTMF dialing feature codes indicated are used to program the unit.

Figure 8:
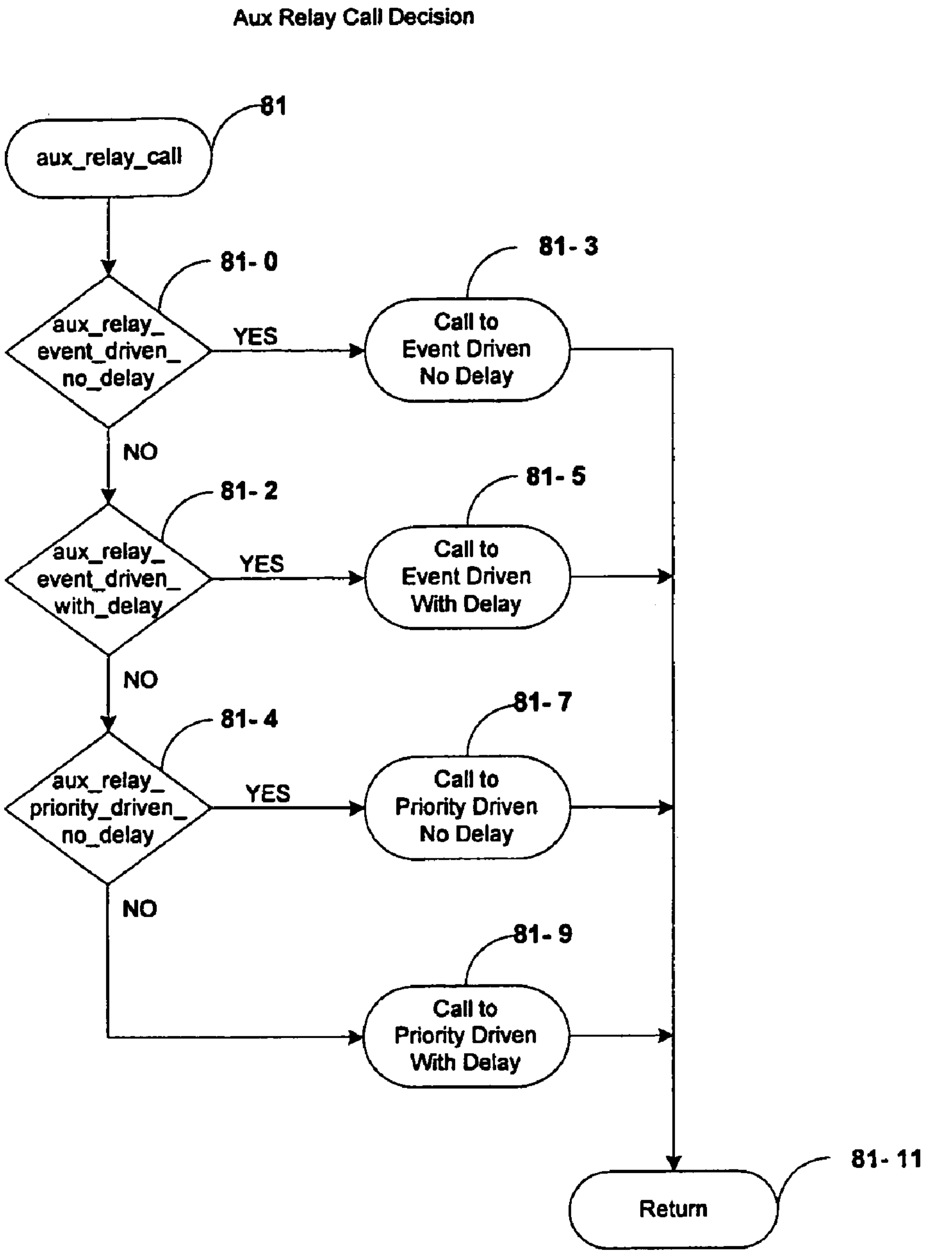
FIG. 8 shows an exemplary flow diagram of the method of the Auxiliary Relay Service Routine Decision Branch.

Further details of the flow diagram of the Aux_Relay_Call routine of step 81 in FIG. 6 are shown in FIG. 8. In the Aux Relay Call flow diagram, the proper service routine selection is made based on the preprogrammed, user selected parameters for the desired Aux Relay operation. For example, as shown in step 81-0 of FIG. 8, if the Aux Relay is to be event driven with no delay, a call to the Event_Driven_NO_Delay routine is made in step 81-3. If not, the flow diagram proceeds to step 81-2. In step 81-2, if the Aux Relay is to be event driven with delay, a call to the Event_Driven_With_Delay routine is made in step 81-5. If not, the flow diagram proceeds to step 81-4. In step 81-4, if the Aux Relay is to be priority driven with no delay, a call to the Priority_Driven_NO_Delay routine is made in step 81-7. If not, the flow diagram proceeds directly to the Priority_Driven_With_Delay routine in step 81-9. The flow diagram then returns from the Aux_Relay_Call routine of step 81.

Figure 9:
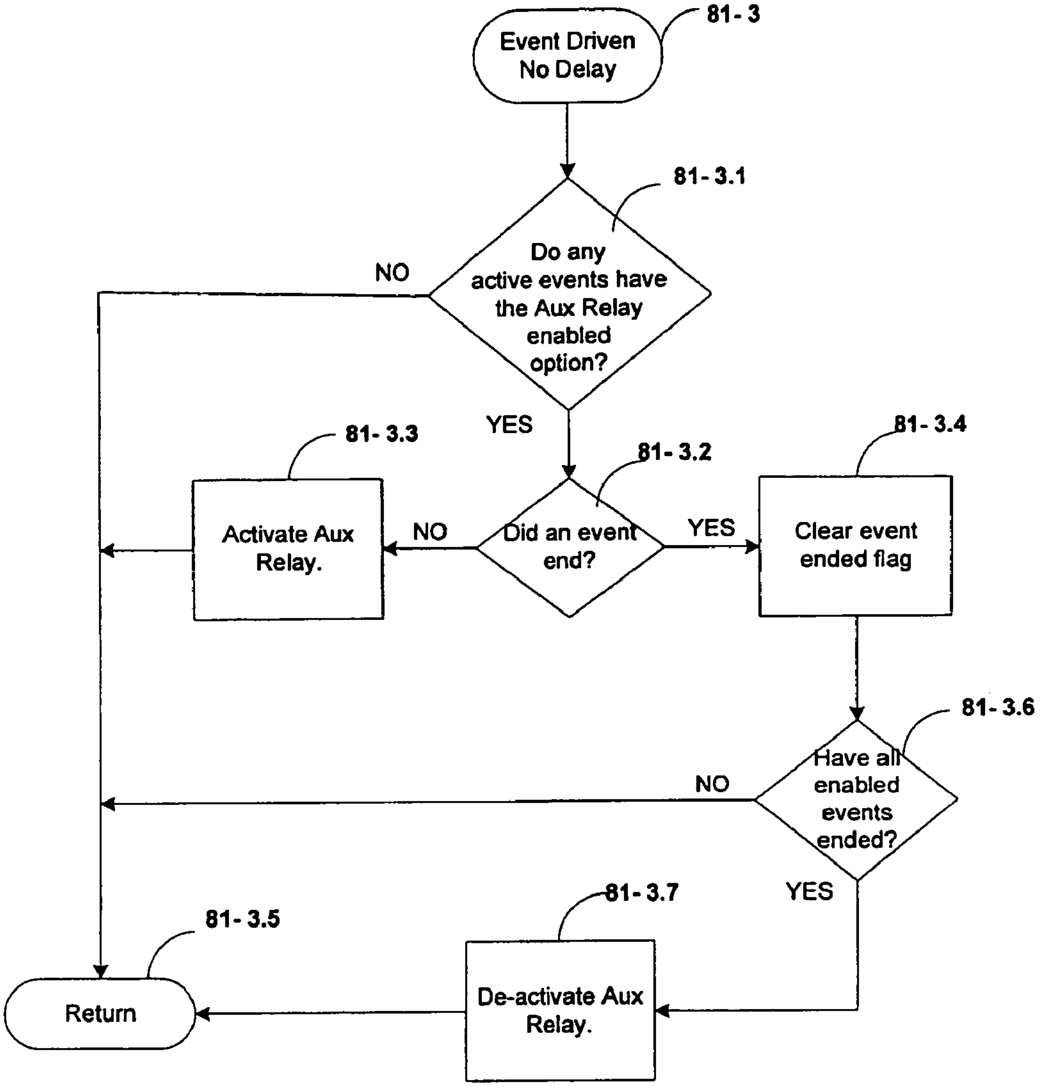
FIG. 9 shows an exemplary flow diagram of the method of the Auxillary Relay Event Driven No Delay Branch.

FIG. 9 shows the details of the Aux Relay "Event Driven_NO_Delay" routine of step 81-3 of FIG. 8. If the active event input is not enabled to control the Aux Relay contacts in step 81-3.1, then the return path of step 81-3.5 will be taken with no Aux Relay activation. Alternatively, if in step 81-3.3, the input event has been enabled for Aux Relay operation, then the Aux Relay will activate in step 81-3.4 before returning. Any additional input events with the Aux Relay option enabled will also instruct the relay to activate, but since it already is, there will be no effect from this action. When an input event ends in step 81-3.2, the event-ended flag for that event will be cleared in step 81-3.4. If all input events that are enabled to control the Aux Relay contacts have ended in step 81-3.7, the Aux Relay will deactivate. If not, the Aux Relay will return in step 81-3.5.

Figure 10:
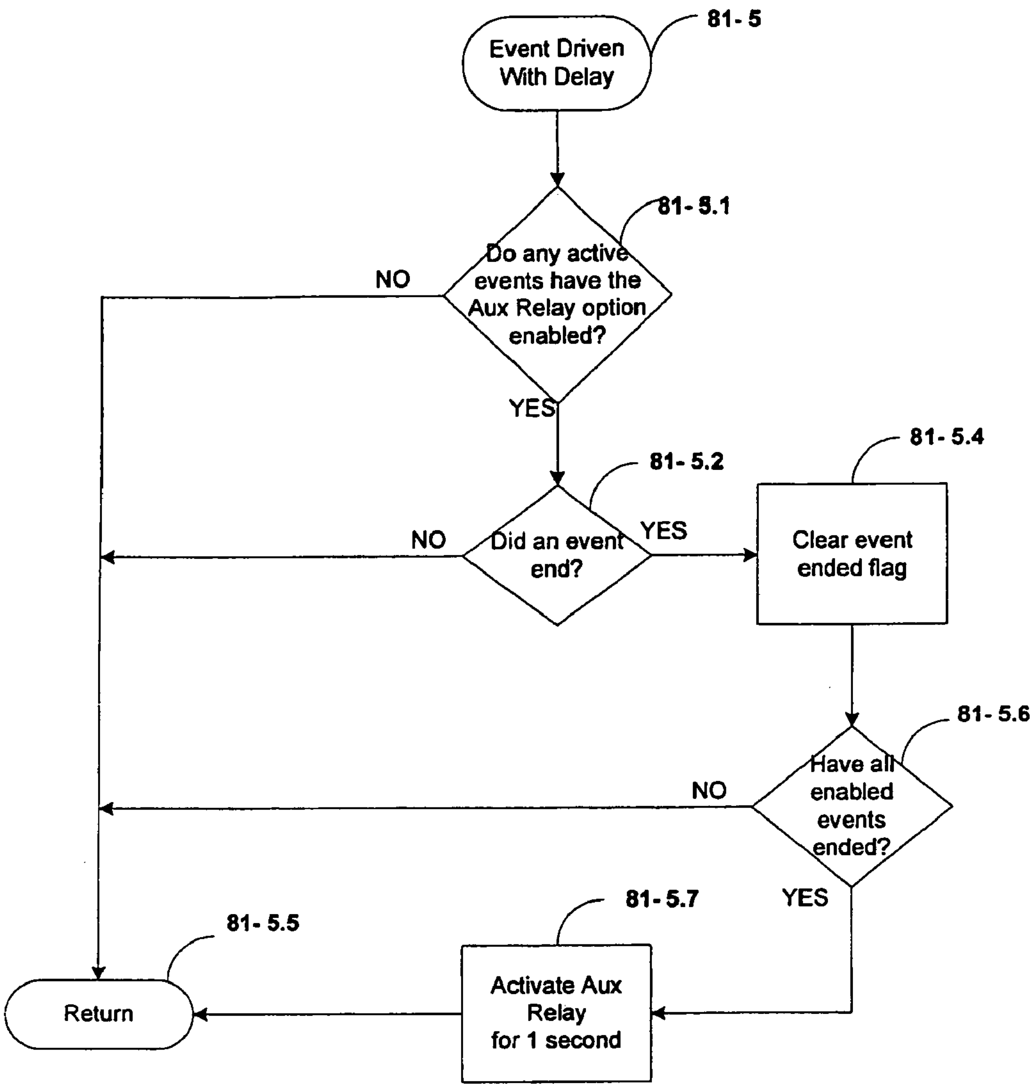
FIG. 10 shows an exemplary flow diagram of the method of the Auxillary Relay Event Driven With Delay Branch.

FIG. 10 shows the details of the Aux Relay "Event_Driven_ With_Delay" routine of step 81-5 of FIG. 8. Again, if the active input event does not have the Aux Relay option enabled in step 81-5.1, the return path will be followed with no action taken in step 81-5.5. If the input event's Aux Relay option is enabled in step 81-5.1, no action is taken at the beginning, since the action is to be done at the end of the event. Any additional enabled input events will likewise not activate the Aux Relay contacts. When an input event has ended in step 81-5.2, the event-ended flag for that event will be cleared in step 81-5.4. If all events, which have the Aux Relay option enabled, have ended in step 81-5.6, the Aux Relay will activate for one second in step 81-5.7. If not, then return the calling routine in step 81-5.5.

Figure 11:
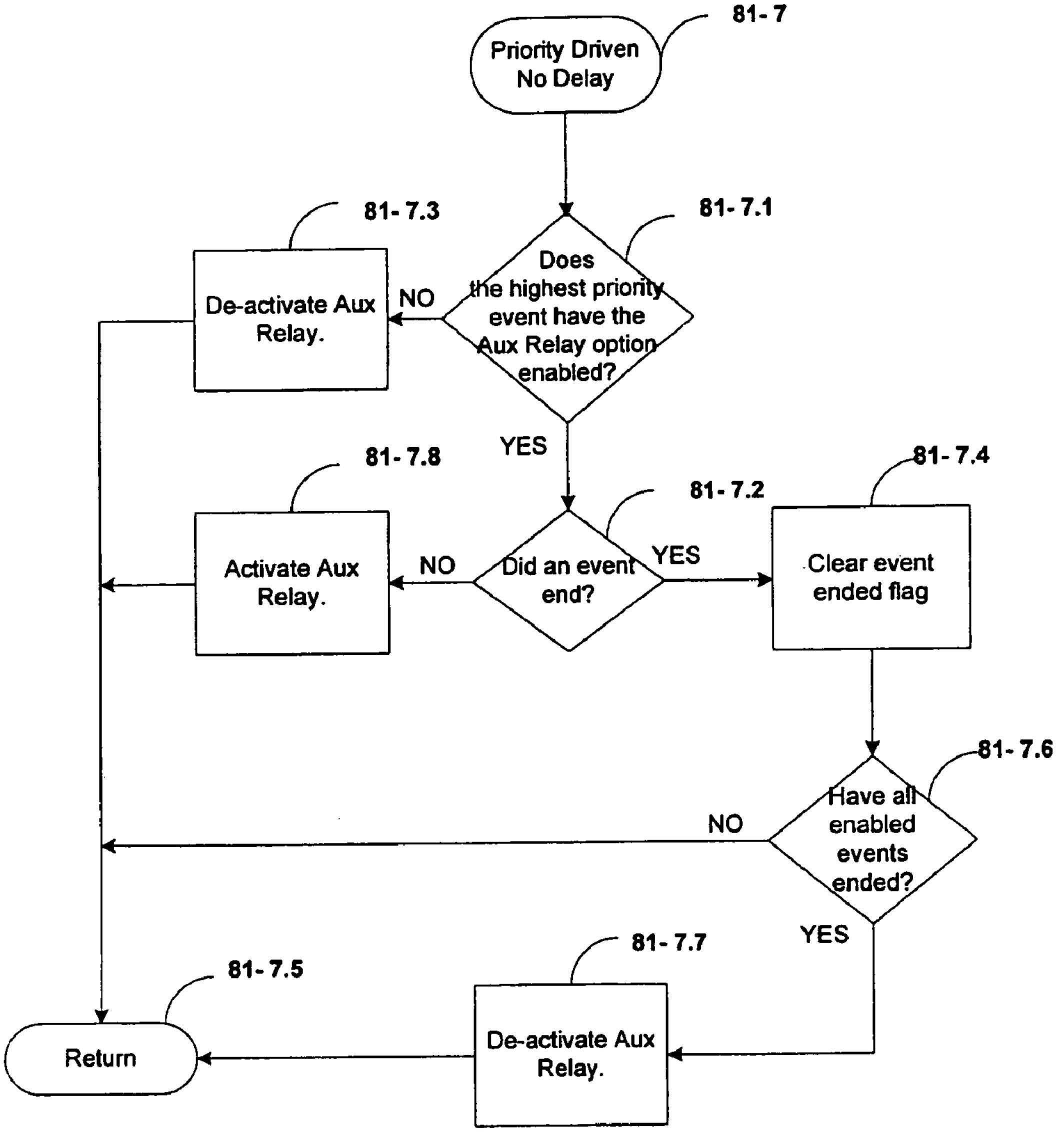
FIG. 11 shows an exemplary flow diagram of the method of the Auxiliary Relay Priority Driven No Delay Branch.

FIG. 11 shows the details of the Aux Relay "Priority_Driven_NO_Delay" routine of step 81-7 of FIG. 8. In this routine, the Aux Relay enable/disabled status of the highest priority active input event will determine the Aux Relay action. If the current highest priority input event has the Aux Relay option disabled in step 81-7.1, the routine will deactivate the Aux Relay in step 81-7.3. Likewise, if it were enabled in step 81-7.1, the routine would activate the Aux Relay in step 81-7.5. On every 10 mS interrupt the Aux Relay option status of the current highest priority input event is examined with the Aux Relay responding accordingly. When an event ended in step 81-7.2, the event-ended flag for that event will be cleared in step 81-7.4. If all events that have the Aux Relay option enabled have ended in step 81-7.5, the Aux Relay will be deactivated in step 81-7.6. If not, then return to the calling routine in step 81-7.5.

Figure 12:
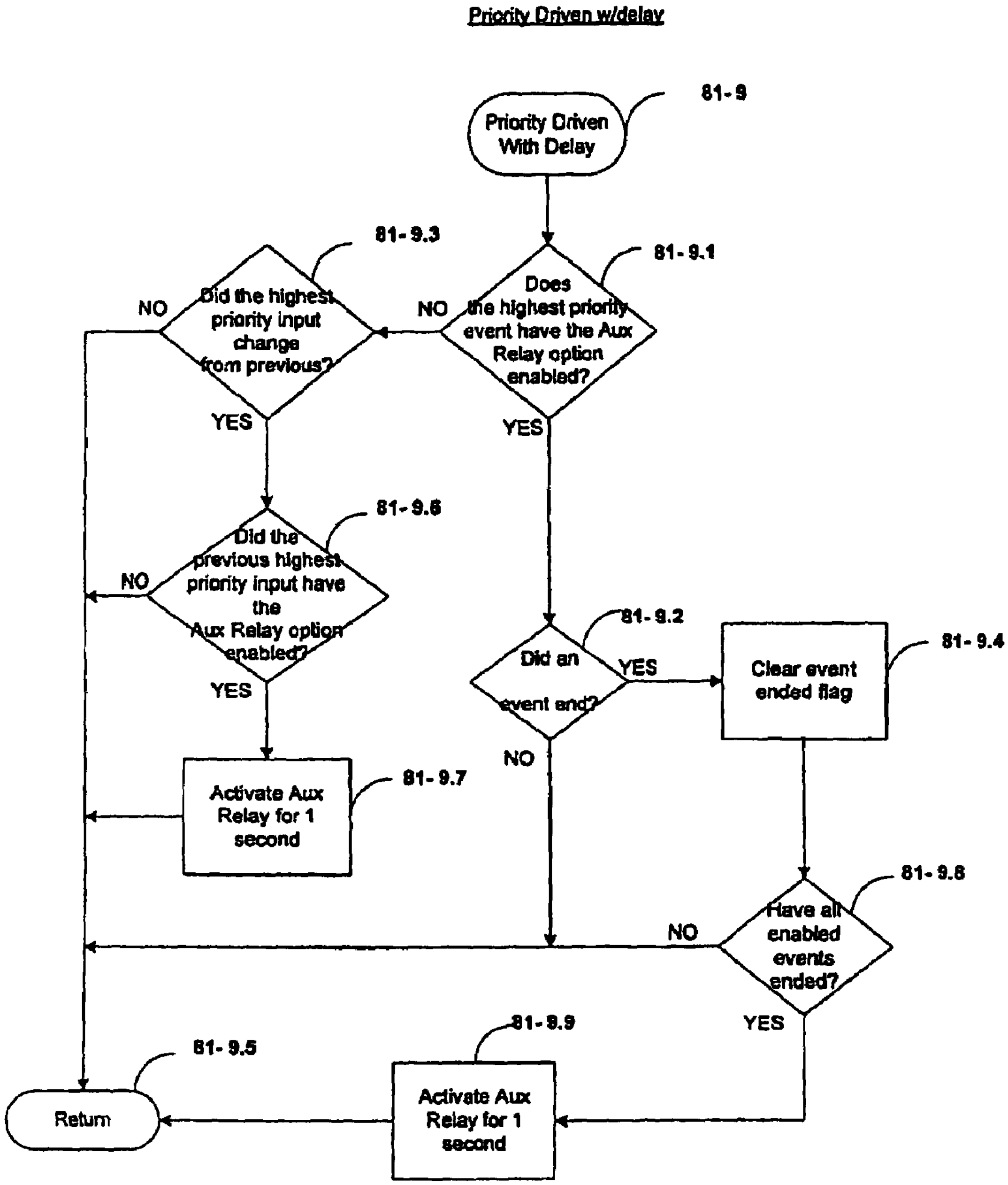
FIG. 12 shows an exemplary flow diagram of the method of Auxillary Relay Priority Driven With Delay Branch.

FIG. 12 shows the details of the Aux Relay "Priority Driven_With_Delay" routine of step 81-9 of FIG. 8. On every 10 mS interrupt, the routine determines if the current highest priority input event has the Aux Relay option enabled in step 81-9.1. If it does not, then whether the current highest input just changed is determined in step 81-9.3. If yes, then whether the previous one has its Aux Relay option enables is determined in step 81-9.6. If yes then the Aux relay will activate for one second in step 81-9.7. If no, then no action is taken and the routine returns in step 81-9.5. If the current highest input does have the Aux Relay option enabled in step 81-9.1, the routine waits until that event ends in step 81-9.2, clears the event flag in step 81-9.4 and waits until all subsequent highest priority events that have the Aux Relay option enabled have ended in step 81-9.8, at which time the Aux Relay will activate for one second in step 81-9.9 and then returns to the calling routine in step 81-9.5.

The foregoing description of the invention illustrates and describes the present invention. Additionally, the disclosure shows and describes only the preferred embodiments of the invention in the context of a method for increasing the yield of programmable logic devices, but, as mentioned above, it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described herein above are further intended to explain best modes known of practicing the invention and to enable others skilled in the art to utilize the invention in such, or other, embodiments and with the various modifications required by the particular applications or uses of the invention. Accordingly, the description is not intended to limit the invention to the form or application disclosed herein. Also, it is intended that the appended claims be construed to include alternative embodiments.

What is claimed is:

1. A method for servicing an event driven with no delay selection in a programmable paging controller for controllably connecting an input signal from a telephone system to at least one audio output, the method comprising the steps of:

determining whether any active events have an Aux Relay option enabled;

determining whether any active events have ended;

activating the Aux Relay and returning to a calling routine if an enabled event continues;

clearing an event ended flag if an active event has ended;

determining whether all enabled events have ended;

returning to a calling routine if all other enabled events continue; and de-activating the Aux Relay and returning to a calling routine if all enabled events have ended, wherein each active event has an event ended flag.

2. A method for servicing an event driven with delay selection in a programmable paging controller for controllably connecting an input signal from a telephone system to at least one audio output, the method comprising the steps of:

determining whether any active events have an Aux Relay option enabled;

determining whether any active events have ended;

clearing an event ended flag if an active event has ended;

determining whether all enabled events have ended;

returning to a calling routine if other enabled events continue; and activating an Aux Relay for one second and returning to a calling routine if all enabled events have ended, wherein each active event has an event ended flag.

3. A method for servicing a priority driven with no delay selection in a programmable paging controller for controllably connecting an input signal from a telephone system to at least one audio output, the method comprising the steps of:

determining whether a highest priority event has an Aux Relay option enabled;

de-activating the Aux Relay option and returning to a calling routine if a highest priority event is not enabled;

determining whether any active events have ended;

clearing an event ended flag if an active event has ended;

activating an Aux Relay and returning to a calling routine if the event continues;

determining whether all enabled events have ended;

returning to a calling routine if all other enabled events continue; and de-activating the Aux Relay and returning to a calling routine if all enabled events have ended, wherein each active event has an event ended flag.

4. A method for servicing a priority driven with delay selection in a programmable paging controller for controllably connecting an input signal from a telephone system to at least one audio output, the method comprising the steps of:

determining whether a highest priority event has an Aux Relay option enabled;

determining whether an enabled event has ended;

clearing an event ended flag if an enabled event has ended;

determining whether all enabled events have ended;

returning to a calling routine if other enabled events continue;

activating an Aux Relay for one second and returning to a calling routine if all the enabled events have ended;

determining whether a highest priority input changed;

returning to a calling routine if no change in the highest priority input;

determining whether a previous highest priority input has the Aux Relay option enabled;

returning to a calling routine if the Aux Relay option is not enabled; and activating the Aux Relay for one second if the Aux Relay option is enabled and returning to calling routine, wherein each active event has an event ended flag.

* * * * *